(12) United States Patent
Sloan et al.

(10) Patent No.: US 7,661,251 B1
(45) Date of Patent: Feb. 16, 2010

(54) HEADER FLOAT SYSTEM FOR USE WITH AN AGRICULTURAL WINDROWER OR COMBINE

(75) Inventors: Charles S. Sloan, Blakesburg, IA (US); Thomas D. Bebernes, Ottumwa, IA (US); Steven K. Parsons, Ottumwa, IA (US); Lary Williams, Dubuque, IA (US); Tom Nichols, Eldon, IA (US); Dave V. Rotole, Bloomfield, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/196,521

(22) Filed: Aug. 22, 2008

(51) Int. Cl.
*A01D 41/14* (2006.01)
*A01D 46/08* (2006.01)
*A01D 75/28* (2006.01)

(52) U.S. Cl. ...................... 56/10.2 E; 60/413
(58) Field of Classification Search ............... 56/10.2 E, 56/15.8, 208, 121.46; 60/413, 470, 484
See application file for complete search history.

(56) References Cited

U.S. PATENT DOCUMENTS

| | | | |
|---|---|---|---|
| 3,597,907 A | | 8/1971 | Neal et al. |
| 3,623,304 A | | 11/1971 | Molzahn |
| 3,717,983 A | * | 2/1973 | Reitz et al. ..................... 56/208 |
| 3,717,995 A | | 2/1973 | Case |
| 4,307,560 A | * | 12/1981 | Swanson ..................... 56/11.9 |
| 4,414,792 A | * | 11/1983 | Bettencourt et al. ....... 56/10.2 E |
| 4,622,803 A | | 11/1986 | Lech |
| 4,724,661 A | | 2/1988 | Blakeslee et al. |
| 5,359,836 A | * | 11/1994 | Zeuner et al. ............. 56/10.2 E |
| 5,381,645 A | * | 1/1995 | Schumacher et al. ....... 56/10.2 E |
| 5,471,823 A | | 12/1995 | Panoushek et al. |
| 5,577,373 A | | 11/1996 | Panoushek et al. |
| 5,704,200 A | * | 1/1998 | Chmielewski et al. .... 56/10.2 E |
| 5,964,077 A | * | 10/1999 | Guinn ..................... 56/10.2 E |
| 6,041,583 A | | 3/2000 | Goering et al. |
| 6,260,355 B1 | * | 7/2001 | Rausch et al. .................. 60/413 |
| 6,758,029 B2 | | 7/2004 | Beaujot |
| 6,843,046 B2 | * | 1/2005 | Heidjann et al. .............. 56/208 |
| 7,191,582 B2 | * | 3/2007 | Bomleny ................. 56/10.2 E |

* cited by examiner

*Primary Examiner*—Árpád Fábián-Kovács
(74) *Attorney, Agent, or Firm*—Taylor & Aust, P.C.

(57) ABSTRACT

An agricultural harvester includes a traction unit and a crop harvesting header coupled with the traction unit. The header includes a main frame with a right hand (RH) side and a left hand (LH) side. A RH gauge wheel is movably coupled with the RH side of the main frame, and a RH hydraulic cylinder is coupled between the RH gauge wheel and the main frame. A first hydraulic circuit is coupled with the RH hydraulic cylinder and configured to control an operating height of the RH gauge wheel. A LH gauge wheel is movably coupled with the LH side of the main frame, and a LH hydraulic cylinder is coupled between the LH gauge wheel and the main frame. A second hydraulic circuit is coupled with the LH hydraulic cylinder and configured to control an operating height of the LH gauge wheel. The second hydraulic circuit is independent from the first hydraulic circuit. A third hydraulic circuit is coupled with a vertical position hydraulic cylinder and configured to operate at a predetermined operating pressure, whereby a portion of the weight of the header is carried by the traction unit. The third hydraulic circuit is independent from each of the first hydraulic circuit and the second hydraulic circuit.

13 Claims, 5 Drawing Sheets

HEADER FLOAT SYSTEM FOR USE WITH AN AGRICULTURAL WINDROWER OR COMBINE

FIELD OF THE INVENTION

The present invention relates to agricultural harvesters, and, more particularly, to lift and float systems used on headers for such harvesters.

BACKGROUND OF THE INVENTION

An agricultural harvester, such as a combine or windrower, is a large machine used to harvest a variety of crops from a field. In the case of a combine, during a harvesting operation, a header at the front of the combine cuts ripened crop from the field. A feeder housing supporting the header transfers the crop material into the combine. Threshing and separating assemblies within the combine remove grain from the crop material and transfer the clean grain to a grain tank for temporary holding. Crop material other than grain exits from the rear of the combine. An unloading auger transfers the clean grain from the grain tank to a truck or grain cart for transport, or to another receiving bin for holding.

In the case of a windrower, during a harvesting operation, a header at the front of the windrower cuts ripened crop from the field. The crop is transported to the rear of the header and forming shields form a windrow of the crop between the tires of the vehicle for natural dry down of the crop. A subsequent field operation picks up the windrows for further processing, such as separating and cleaning in the case of grain crops, or baling or chopping in the case of hay.

Platform headers and draper headers are header types commonly used when harvesting crops such as small grains, peas, lentils, and rice. During a harvesting operation with these header types, it is desirable to maintain a predetermined cutting height. To accomplish this, it is known to use a header float system or a terrain following system to enable the header to follow the ground over changing terrain without gouging or digging into the soil.

Manufacturers have developed a number of header float systems for use on harvesters such as combines, windrowers, etc. over the years. U.S. Pat. Nos. 3,717,995, 3,623,304, and 4,724,661 disclose examples of header float systems using a resilient suspension to suspend the header, thereby reducing the apparent weight of the header, allowing it to lightly skid across the ground over changing terrain. U.S. Pat. Nos. 3,597,907, 4,622,803 and 5,471,823 disclose examples of similar float systems, but using a dynamic suspension to suspend the header. U.S. Pat. Nos. 5,577,373, 6,041,583 and 6,758,029 B2 disclose examples of terrain following systems which dynamically position the header, thereby sensing and changing the vertical position of the header to follow changing terrain.

What is needed in the art is a float system for a header which accommodates both cutting height and tilt on the header, and load distribution between the header and traction unit.

SUMMARY OF THE INVENTION

The invention in one form is directed to an agricultural harvester, including a traction unit and a crop harvesting header coupled with the traction unit. The header includes a main frame with a right hand (RH) side and a left hand (LH) side. A RH gauge wheel is movably coupled with the RH side of the main frame, and a RH hydraulic cylinder is coupled between the RH gauge wheel and the main frame. A first hydraulic circuit is coupled with the RH hydraulic cylinder and configured to control an operating height of the RH gauge wheel. A LH gauge wheel is movably coupled with the LH side of the main frame, and a LH hydraulic cylinder is coupled between the LH gauge wheel and the main frame. A second hydraulic circuit is coupled with the LH hydraulic cylinder and configured to control an operating height of the LH gauge wheel. The second hydraulic circuit is independent from the first hydraulic circuit. A third hydraulic circuit is coupled with a vertical position hydraulic cylinder and configured to operate at a predetermined operating pressure, whereby a portion of the weight of the header is carried by the traction unit. The third hydraulic circuit is independent from each of the first hydraulic circuit and the second hydraulic circuit.

The invention in another form is directed to a hydraulic system for use with a header of an agricultural harvester. The hydraulic system includes a first hydraulic circuit coupled with a hydraulic cylinder of a first gauge wheel which is movably attached to a main frame of the header. A second hydraulic circuit is coupled with a hydraulic cylinder of a second gauge wheel which is movably attached to the main frame of the header. The second hydraulic circuit is independent from the first hydraulic circuit. A third hydraulic circuit is coupled with a vertical position cylinder which is used for moving the header vertically relative to a traction unit. The third hydraulic circuit is independent from each of the first hydraulic circuit and the second hydraulic circuit. A controller independently controls the first hydraulic circuit, the second hydraulic circuit and the third hydraulic circuit, whereby an operating height of the first gauge wheel is controlled by controlling a volume of hydraulic fluid in the first hydraulic circuit, an operating height of the second gauge wheel is controlled by controlling a volume of hydraulic fluid in the second hydraulic circuit, and a portion of a weight of the header carried by the first gauge wheel and the second gauge wheel is controlled by controlling a fluid pressure in the third hydraulic circuit.

DETAILED DESCRIPTION OF THE INVENTION

Figure 1:
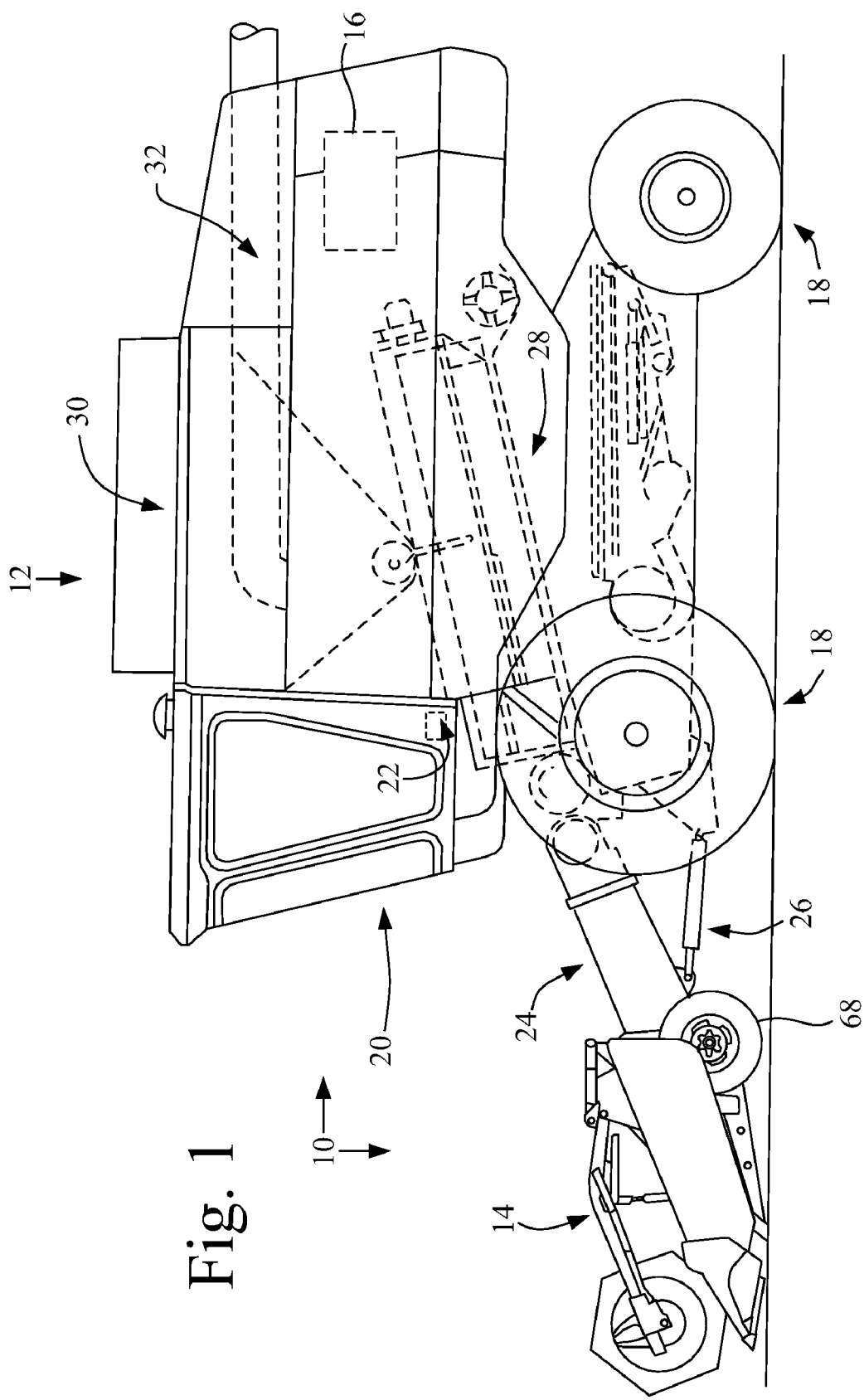
FIG. 1 is a side-view of a harvester in the form of a combine, showing an embodiment of a header of the present invention.

Referring now to the drawings, and more particularly to FIG. 1, there is shown an embodiment of an agricultural harvester in the form of a self-propelled combine 10 commonly used in a grain farming operation to harvest a variety of crops from a field. Combine 10 generally includes a traction unit 12 which carries a header 14 at the forward end thereof.

Traction unit 12 includes an onboard engine 16 which powers combine 10, while ground engaging wheels 18 support and propel combine 10. An operator controls combine 10 from an operator's station located in a cab 20 at the front of traction unit 12. An electronic control unit (ECU) 22 receives commands from operator input devices and sensors, and commands various function of combine 10.

A feeder housing 24 pivotally attaches at the front of the combine 10, supporting header 14 which is removably attached to the front of the feeder housing 24. A pair of lift cylinders 26 support and articulate feeder housing 24 from combine 10, enabling the raising and lowering of header 14 relative to the ground. Lift cylinders 26 may be single or double acting hydraulic cylinders connected to a main hydraulic circuit on combine 10.

During a harvesting operation, combine 10 moves forward through the field with header 14 lowered to a working height. Header 14 cuts and transfers crop material to the feeder housing 24, which in turn transfers the crop material into combine 10. Once inside the combine, threshing and separating assemblies 28 remove grain from the crop material and transfer it to a grain tank 30 for temporary holding. Crop material other than grain exits from the rear of the combine 10. An unloading auger 32 transfers the grain from grain tank 30 to a truck or grain cart for transport, or to another receiving bin for holding.

Figure 2:
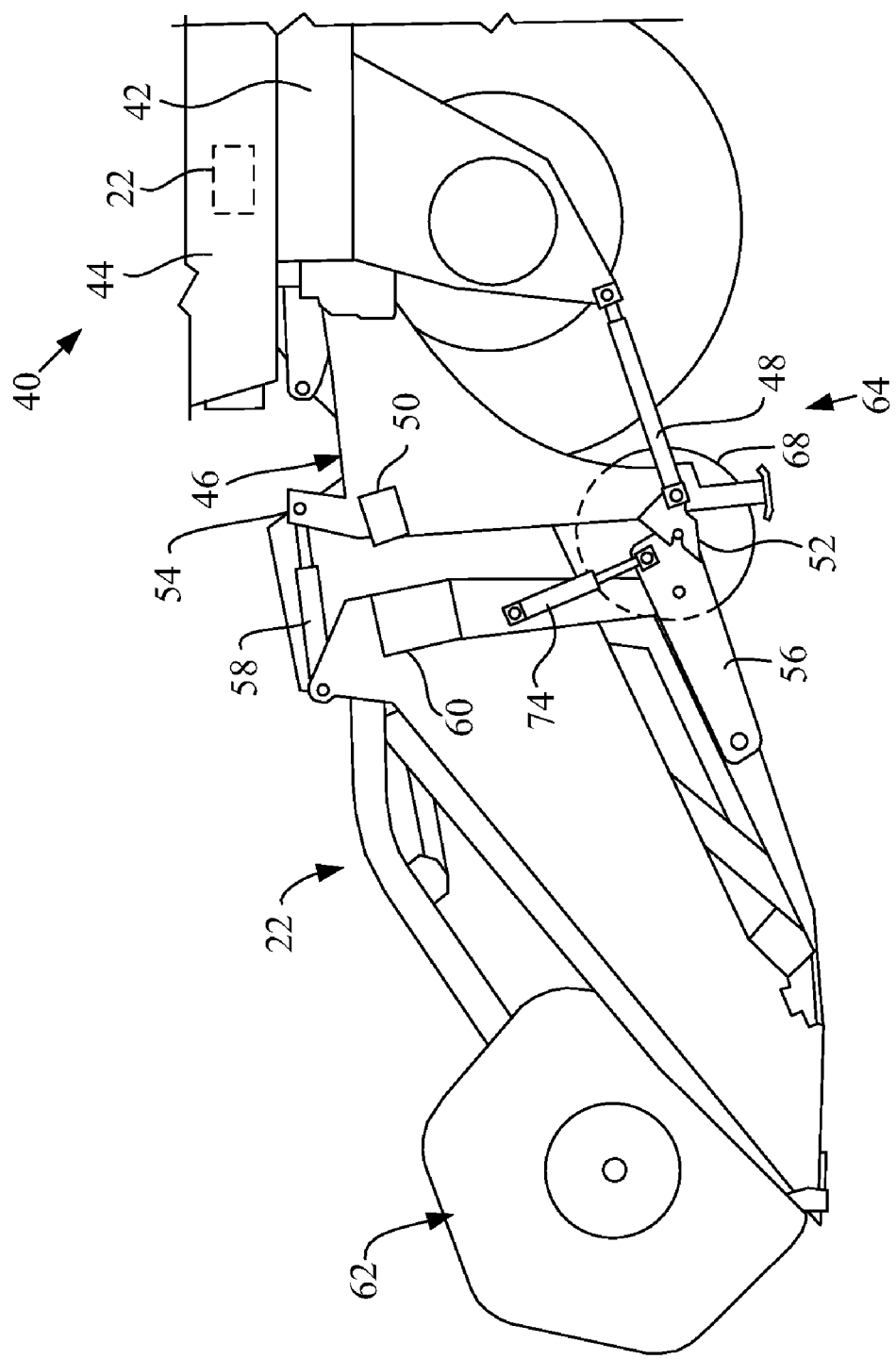
FIG. 2 is a side view of the header in FIG. 1, shown attached to the front of a windrower (shown partially)

FIG. 2 illustrates header 14 coupled with a traction unit in the form of a windrower 40 (shown partially) rather than a combine 10 as shown in FIG. 1. Providing a single floating header 14 which can be coupled with different types of traction units (e.g., a combine or windrower) allows reduction in operating costs.

Similar to combine 10, windrower 40 includes a vehicle chassis 42 supporting an operator's cab 44. Windrower 40 also typically includes at least one onboard ECU 22, usually positioned at a convenient location within cab 44 as shown. It will be appreciated that ECU 22 can be configured and/or programmed differently than ECU 22 shown in FIG. 1, since the functions of the units differ. ECU 22 includes the control logic for operation of the electronics and hydraulics associated with header 14, as will be described in more detail below. A number of hydraulic hoses (not specifically shown) carried on header 14 are coupled with the main hydraulics of windrower 40 for various hydraulic functions, also to be described in more detail below.

Windrower 40 includes a lift frame 46 which is pivotally mounted to vehicle chassis 42 and detachably interconnects vehicle chassis 42 with header 14. A pair of lift cylinders 48 coupled between vehicle chassis 42 and lift frame 46 are used to move header 14 to a selected operating or transport height. A mechanical drive 50 extending laterally from lift frame 46 is coupled with driven mechanical components (e.g., cutter-bar) on header 14 in known manner.

Lift frame 46 includes a pair of bottom couplers 52 and a top coupler 54. Each bottom coupler 52 attaches in a conventional quick attach manner with an outboard end of a corresponding lower link 56. Top coupler 54 attaches with an outboard end of upper link 58, configured as a tilt cylinder in the illustrated embodiment. When header 14 is detached from windrower 40, lift frame 46 remains pivotally mounted to vehicle chassis 42.

Lift frame 46 has an advantage of simply and directly interconnecting header 14 with vehicle chassis 42 of windrower 40. It is also possible to use an intervening sub-frame between lift frame 46 and header 14. The sub-frame would remain attached to header 14 when detached from lift frame 46, and would have an advantage of holding upper link 58 at a fixed orientation for easier subsequent attachment with lift frame 46.

Figure 3:
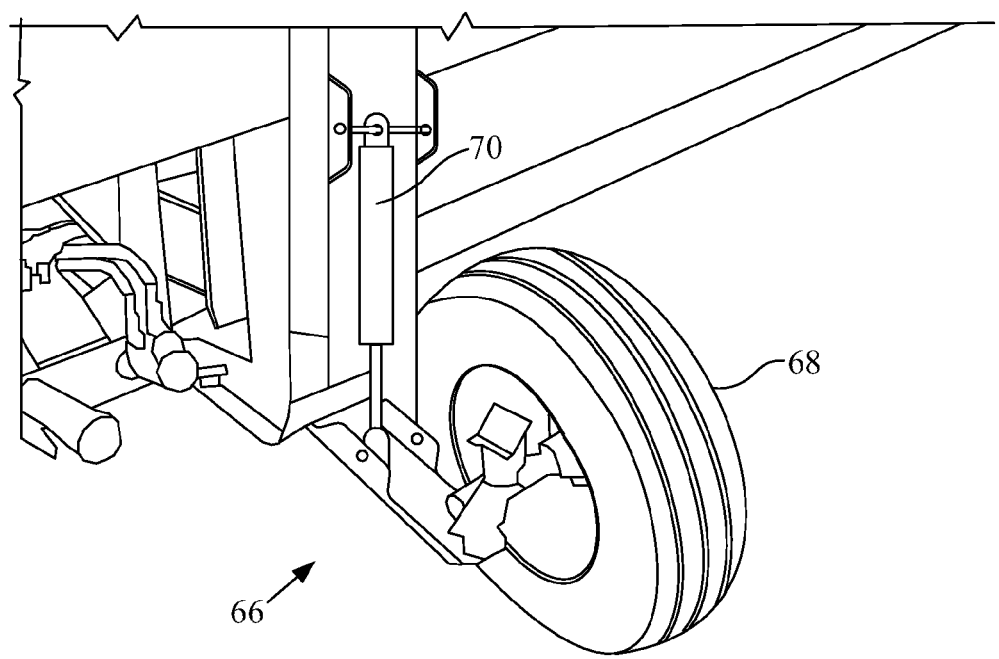
FIG. 3 is a partial, rear perspective view of the header shown in FIGS. 1 and 2, showing a gauge wheel and associated hydraulic cylinder.

Referring to FIGS. 2 and 3, header 14 is configured as a draper header in the illustrated embodiment, but could also be configured as a different type of header, such as an auger feed header. Moreover, draper header 14 is shown as being configured as a rigid frame draper, but could also be configured as a flexible frame header.

Header 14 generally includes a main frame 60 supporting a reel assembly 62, a cutter-bar assembly (not shown), and a draper assembly (not shown). A floating suspension system 64 coupled with main frame 60 primarily supports header 14 from lift frame 46, while a pair of gauge wheels assemblies 66 serve to secondarily support header 14 from the ground. Gauge wheel assemblies 66 are coupled with the right hand (RH) and left hand (LH) sides of main frame 60, respectively. Each gauge wheel assembly 66 includes a gauge wheel 68 movably coupled with main frame 60, and a hydraulic cylinder 70 coupled between the gauge wheel and main frame 60.

Figure 4:
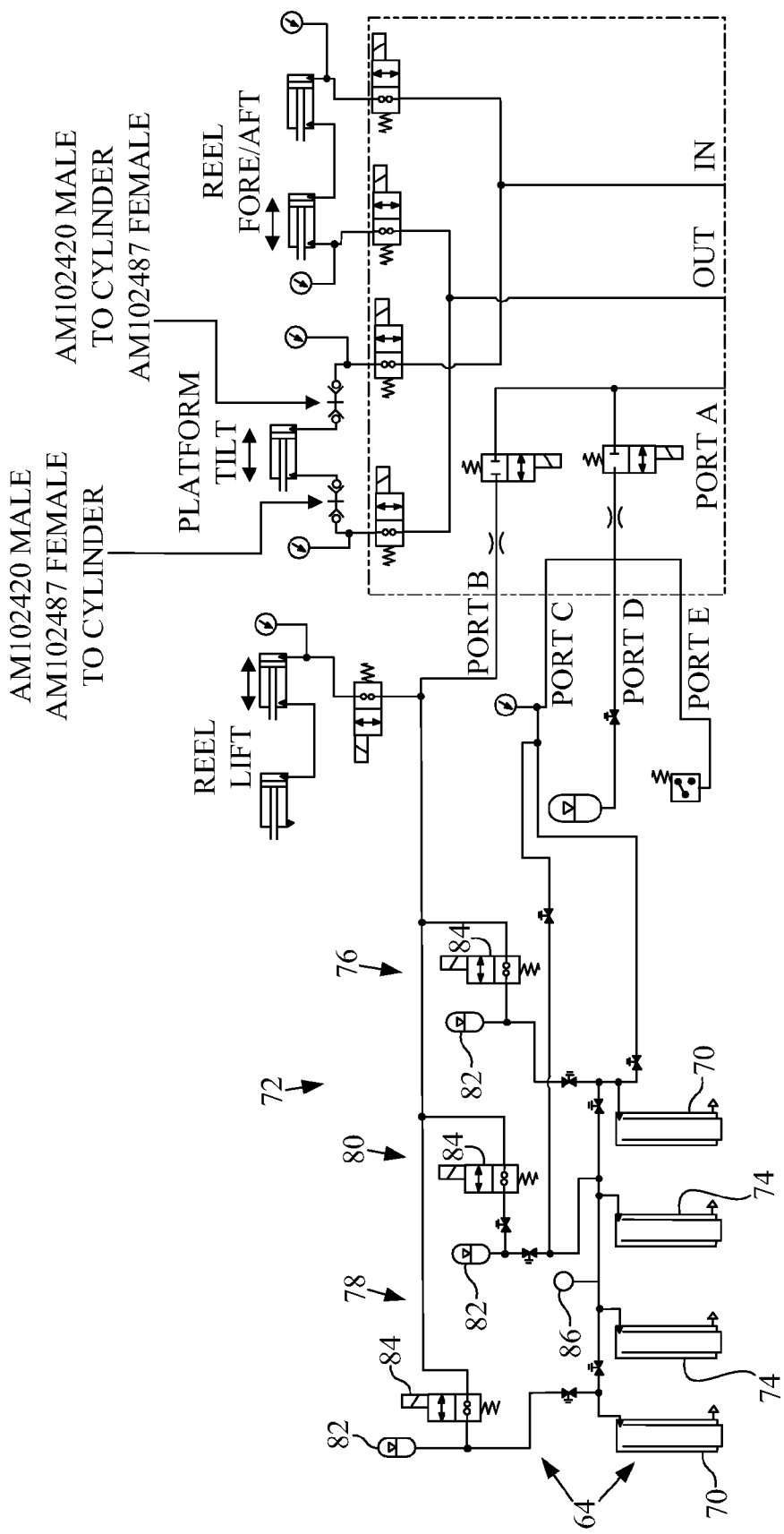
FIG. 4 is a schematic view of an embodiment of a hydraulic circuit used with the header shown in FIGS. 1-3.

Referring to FIGS. 2-4, floating suspension system 64 includes lower links 56, upper link 58, gauge wheel assemblies 66, and a hydraulic system 72. Hydraulic system 72 includes the pair of hydraulic cylinders 70 associated with each gauge wheel assembly 66, and also includes a pair of vertical position hydraulic cylinders 74. In the embodiment shown, each vertical position hydraulic cylinders 74 is configured as a float cylinder which interconnects main frame 60 with a respective lower link 56. The hydraulic cylinders 70 associated with each gauge wheel assembly, and the pair of vertical position hydraulic cylinders 74, respectively define three independent hydraulic circuits under control of ECU 22. More particularly, a first hydraulic circuit 76 is associated with hydraulic cylinder 70 at the RH side of main frame 60, a second hydraulic circuit 78 is associated with hydraulic cylinder 70 at the LH side of main frame 60, and a third hydraulic circuit 80 is associated with the pair of vertical position hydraulic cylinders 74 at the center of main frame 60. Hydraulic circuits 76, 78 and 80 are each fluidly coupled with the main hydraulic circuit onboard traction unit 12, and each include a separate accumulator 82 and controllable valve 84.

According to an aspect of the present invention, header 14 is configured with an adjustable cutting height and adjustable weight distribution between header 14 and traction unit 12. In general, the cutting height at the outer ends of header 14 is adjusted by changing the volume of hydraulic fluid in the hydraulic cylinders 70 associated with gauge wheel assemblies 66, and the weight distribution between header 14 and traction unit 12 is adjusted by altering the operating hydraulic pressure within float cylinders 74. The operating pressure in third hydraulic circuit 80 relates to the lift force on header 14. Float cylinders 74 still act as float cylinders but at a given operating pressure, in essence acting as a hydraulic "spring".

During a harvesting operation, an operator engages a float activation device (such as a switch) to operate header 14 in a float mode, and may also manipulate a float setting device (such as a dial) for a desired header float response. Once engaged in the header float mode, ECU 22 reads the float setting device, indicating a level of suspension support required of the float suspension system 64 by the operator, for example, as a percent of the header weight or desired pressure in the float circuit. ECU 22 then determines a target pressure in third hydraulic circuit 80 adequate to provide the suspension support commanded.

In general, valve 84 associated with first hydraulic circuit 76 is opened to provide a desired volume of hydraulic fluid within the corresponding hydraulic cylinder 70 associated with RH gauge wheel 68. The volume of fluid in the first hydraulic circuit 76 determines the cutting height at RH gauge wheel assembly 66. Similarly, valve 84 associated with second hydraulic circuit 78 is opened to provide a desired volume of hydraulic fluid within the corresponding hydraulic cylinder 70 associated with LH gauge wheel 68. The volume of fluid in the second hydraulic circuit 76 determines the cutting height at LH gauge wheel assembly 66. A portion of the weight of header 14 is then transferred to traction unit 12 by adjusting the target operating pressure within third hydraulic circuit 80.

To determine the target pressure for third hydraulic circuit 80, ECU 22 may reference data correlating pressure values with suspension support values. This correlated pressure data will vary from header to header as a function of header weight and suspension configuration, and may generate from tables, formulas, or sensor readings (e.g., pressure sensor 86). ECU 22 might read the correlated data from a storage device on header 14. Data might also be stored in memory internal to the combine, with ECU 22 selecting the appropriate data after sensing the header type attached to combine 10.

Alternatively, ECU 22 may determine the target pressure for third hydraulic circuit 80 by reading pressure sensor 86 when header 14 is at a height where the skid plates are not in contact with the ground. At such a height, floating suspension system 64 supports the entire weight of header 14, and the pressure in the third hydraulic circuit 80 indicates a baseline pressure whereby float cylinders 74 entirely support header 14. ECU 22 then determines the target pressure by multiplying the baseline pressure by a factor corresponding to the suspension support indicated from the float setting device.

ECU 22 continuously compares the target pressure with pressure sensor 86 readings indicating pressure in the third hydraulic circuit 80, commanding valve 84 to add or subtract hydraulic fluid from third hydraulic circuit 80 to maintain pressure sensor 86 readings equal to the target pressure. In this manner, ECU 22 continuously maintains target pressure in third hydraulic circuit 80 as float cylinders 74 reciprocate over changing terrain, providing constant support of the header 14 by the suspension system 60 as the combine 10 travels through the field. To change header float response while operating in a header float mode, the operator may further manipulate the float setting device without disengaging the float system. ECU 22 continuously monitors the float setting device for changes, determining and applying new target pressures accordingly. The header float system continues to function until the operator disengages the float activation device.

Alternatively, ECU 22 can initially compare the target pressure with the pressure sensor 86 readings indicating pressure within third hydraulic circuit 80, commanding valve 84 to add or subtract hydraulic fluid from third hydraulic circuit 80 until the reading from the pressure sensor 86 matches the target pressure. Once charged to the target pressure, third hydraulic circuit 80 can be sealed and the corresponding accumulator 82 acts to maintain target pressure in third hydraulic circuit 80 as the float cylinders 74 reciprocate over changing terrain. To change header float response while operating in header float mode, the operator may further manipulate the float setting device without disengaging the float system. ECU 22 continuously monitors the float setting device for changes, determining and applying new target pressures accordingly. The header float system continues to function until the operator disengages the float activation device.

Control logic for header 14 is described above as being under the control of ECU 22 onboard the work machine. However, it is also possible to provide header 14 with an onboard ECU (not shown) with control logic for the electronics and hydraulics used in the header float system. This has the advantage of not having to program the ECU onboard the work machine, and also reducing process loading on the ECU onboard the work machine. Of course, an ECU on the header may be configured to communicate with the ECU on the work machine, either wired or wireless, etc.

In the embodiment above, the fluid pressure associated with float cylinders 74 is used to set a lifting force which in turn transfers weight from header 14 to traction unit 12, 40. It may also be possible, depending upon the configuration, to use an adjustable operating pressure within lift cylinders 26, 48 to transfer weight from header 14 to traction unit 12, 40.

Figure 5:
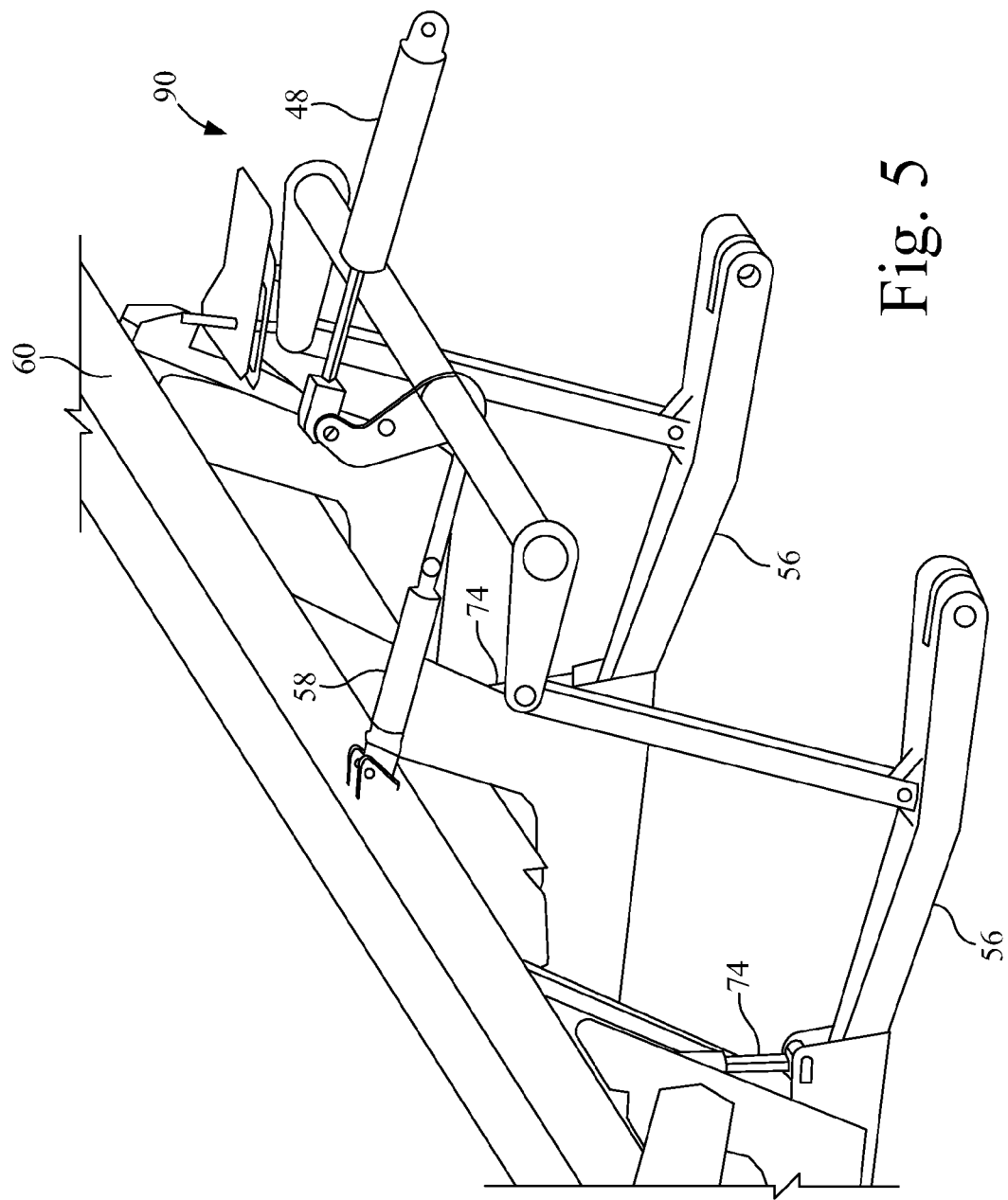
FIG. 5 is a partial, rear perspective view of another embodiment of a header of the present invention.

FIG. 5 illustrates another embodiment of a floating suspension system 90 of the present invention, which generally operates similar to the embodiment of floating suspension system 64 described above. Floating suspension system 90 still includes a pair of lower links 56 which connect to main frame 60 by way of float cylinders 74. Floating suspension system 90 also still includes a tilt cylinder 58 and a lift arm 48. However, only a single lift cylinder 48 is used on top of the suspension system 90, rather than a pair of lift cylinders at the bottom of the suspension system. Floating suspension system 90 also still includes a pair of guide wheel assemblies (not shown) at the RH and LH sides of main frame 60. Operation of the floating suspension system 90 is substantially the same as described above with reference to floating suspension system 64.

Having described the preferred embodiment, it will become apparent that various modifications can be made without departing from the scope of the invention as defined in the accompanying claims.

The invention claimed is:

1. An agricultural harvester, comprising:
 a traction unit; and
 a crop harvesting header coupled with said traction unit, said header including:
  a main frame with a right hand (RH) side and a left hand (LH) side;
  a RH gauge wheel movably coupled with said RH side of said main frame, and a RH hydraulic cylinder coupled between said RH gauge wheel and said main frame;
  a first hydraulic circuit coupled with said RH hydraulic cylinder and configured to control an operating height of said RH gauge wheel;
  a LH gauge wheel movably coupled with said LH side of said main frame, and a LH hydraulic cylinder coupled between said LH gauge wheel and said main frame;
  a second hydraulic circuit coupled with said LH hydraulic cylinder and configured to control an operating height of said LH gauge wheel, said second hydraulic circuit being independent from said first hydraulic circuit;
  a vertical position hydraulic cylinder associated with said header; and
  a third hydraulic circuit coupled with said vertical position hydraulic cylinder and configured to operate at a predetermined operating pressure, whereby a portion of a weight of said header is carried by said traction unit, said third hydraulic circuit being independent from each of said first hydraulic circuit and said second hydraulic circuit.

2. The agricultural harvester of claim 1, wherein said vertical position hydraulic cylinder is a float cylinder coupled with said main frame.

3. The agricultural harvester of claim 2, wherein said harvester is a windrower and further including a lift frame movably mounted to said main frame, said float cylinder being coupled between said lift frame and said main frame of said header.

4. The agricultural harvester of claim 1, wherein said vertical position hydraulic cylinder is a lift cylinder coupled with said traction unit for lifting said header.

5. The agricultural harvester of claim 4, wherein said harvester is a windrower, and said traction unit includes a vehicle chassis, and further including a lift frame movably mounted to said vehicle chassis, said lift cylinder being coupled between said lift frame and said vehicle chassis.

6. The agricultural harvester of claim 4, wherein said harvester is a combine and said traction unit includes a vehicle chassis and a feeder housing movably mounted to said vehicle chassis, said lift cylinder being coupled between said vehicle chassis and said feeder housing.

7. The agricultural harvester of claim 1,
wherein said first hydraulic circuit includes a first accumulator and said operating height of said RH gauge wheel is controlled by controlling a volume of hydraulic fluid in said first hydraulic circuit;
wherein said second hydraulic circuit includes a second accumulator and said operating height of said LH gauge wheel is controlled by controlling a volume of hydraulic fluid in said second hydraulic circuit; and
wherein said third hydraulic circuit includes a third accumulator and said portion of said header weight carried by said traction unit is controlled by controlling a fluid pressure in said third hydraulic circuit.

8. The agricultural harvester of claim 1, wherein said header is a draper header.

9. The agricultural harvester of claim 1, wherein said header is one of a rigid frame header and a flexible frame header.

10. The agricultural harvester of claim 1, further including a controller which independently controls said first hydraulic circuit, said second hydraulic circuit, and said third hydraulic circuit.

11. The agricultural harvester of claim 10, wherein said controller is located on one of said traction unit and said header.

12. A hydraulic system for use with a header of an agricultural harvester, said hydraulic system comprising:
a first hydraulic circuit coupled with a hydraulic cylinder of a first gauge wheel which is movably attached to a main frame of the header;
a second hydraulic circuit coupled with a hydraulic cylinder of a second gauge wheel which is movably attached to said main frame of the header, said second hydraulic circuit being independent from said first hydraulic circuit;
a third hydraulic circuit coupled with a lift cylinder which is used for moving the header vertically relative to a traction unit, said third hydraulic circuit being independent from each of said first hydraulic circuit and said second hydraulic circuit; and
a controller which independently controls said first hydraulic circuit, said second hydraulic circuit, and said third hydraulic circuit, whereby an operating height of said first gauge wheel is controlled by controlling a volume of hydraulic fluid in said first hydraulic circuit, an operating height of said second gauge wheel is controlled by controlling a volume of hydraulic fluid in said second hydraulic circuit, and a portion of a weight of the header carried by said first gauge wheel and said second gauge wheel is controlled by controlling a fluid pressure in said third hydraulic circuit.

13. The hydraulic system of claim 12, wherein said first hydraulic circuit includes a first accumulator, said second hydraulic circuit includes a second accumulator, and said third hydraulic circuit includes a third accumulator.

* * * * *